Patented Nov. 13, 1928.

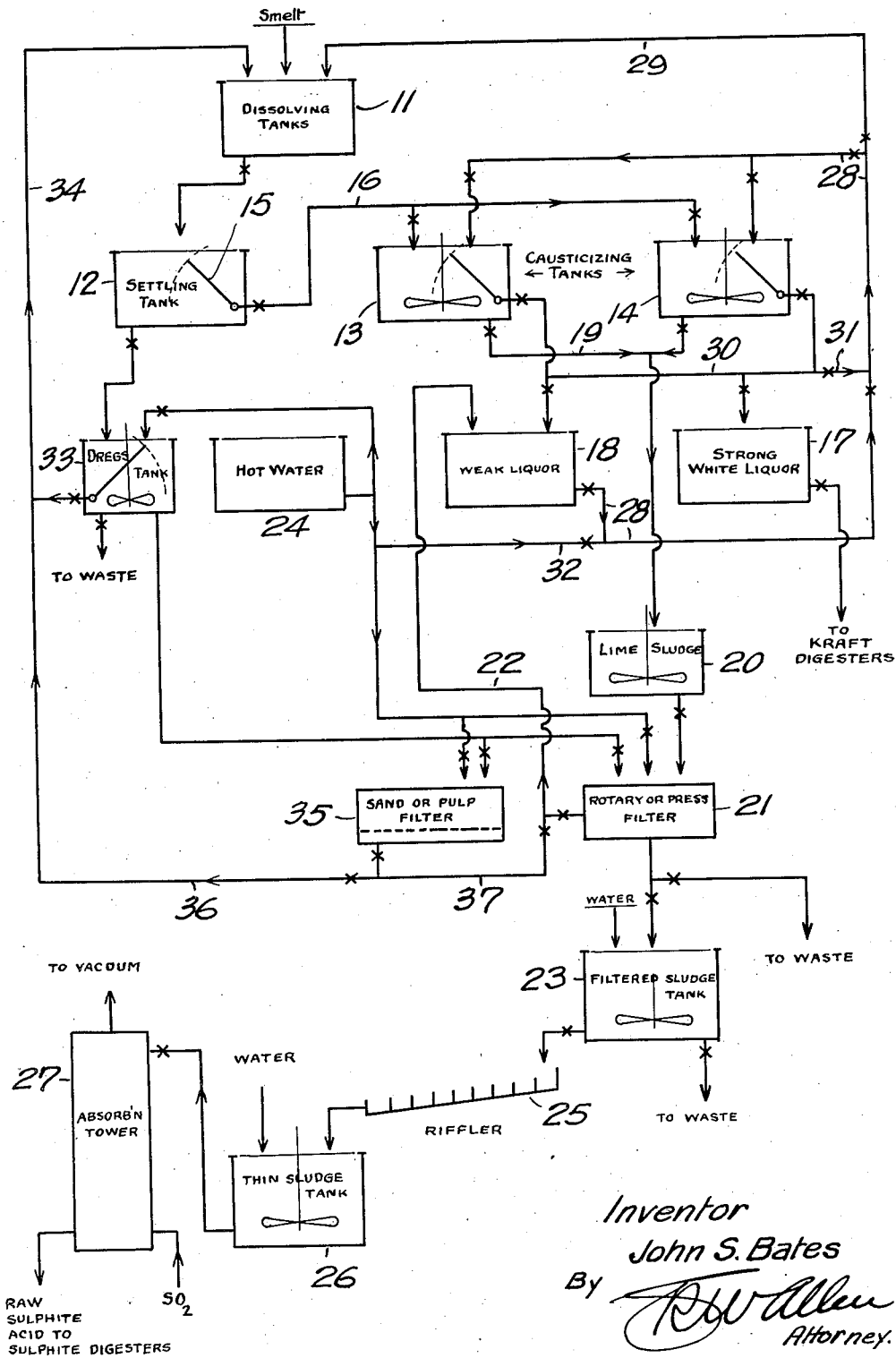

1,691,511

UNITED STATES PATENT OFFICE.

JOHN S. BATES, OF BATHURST, NEW BRUNSWICK, CANADA.

PROCESS OF MAKING CHEMICAL PULP.

Application filed March 2, 1925. Serial No. 12,546.

This invention relates broadly to the art of making chemical pulp for paper manufacture and the like, and relates more particularly to a process of treating the green liquor of the kraft pulp process.

The object of the invention is the purification of the kraft green liquor to obtain the benefits of the resulting better conditions in the causticizing operation and to produce a lime sludge of such purity that it will be the equivalent of or superior to magnesia lime or limestone in an acid sulphite pulp process.

In both the soda and kraft processes of making pulp it is essential to economical operation to recover for further use the valuable alkalis present in the spent liquors discharged with the pulp from the digesters. In each process there results from the causticizing operation as a by-product a large quantity of lime sludge. Owing to differences in the two methods the resulting sludges are entirely different. The soda process sludge is a white, comparatively pure form of precipitated calcium carbonate. The kraft process sludge is mainly calcium carbonate but the proportion of impurities is so high that the sludge is dark gray or black in colour. It has been known for a long time that the lime sludge of the soda process is admirably suited for making bisulphite liquor for an acid pulp process but the sludge of the kraft process has been useless for this purpose owing to the large proportion of the difficultly separable impurities which it contains. In fact, the disposal of this sludge, amounting to some 850 pounds dry weight per ton of pulp made, is a serious problem. Sometimes it can be used for agricultural lime and sometimes it can be disposed of as a filling for low land.

Comprehension of the invention may be facilitated by a comparison of the methods of treatment of the spent liquors of the soda and kraft processes.

In the soda process the cooking liquor is a solution of caustic soda together with a little inactive sodium carbonate and traces of impurities. The spent liquor or "black liquor" from the digesters contains the original alkali largely combined with the non-cellulose constituents which have been dissolved out of the wood. This liquor is evaporated and burned in rotary incinerators to form "black ash" which is approximately 80% soda ash (sodium carbonate) and 20% carbonaceous matter. The ash is then leached to separate the alkali, losses being made up by addition of commercial soda ash, and finally boiled with calcium quicklime to yield caustic soda and calcium carbonate which is settled out as a substantially pure sludge.

In the kraft process the cooking liquor is a mixture of caustic soda and sodium sulphide together with small proportions of inactive sodium carbonate, sodium sulphate and impurities. The black liquor from the digesters is thickened by evaporation but is only slightly incinerated so that it is about 50% carbonaceous matter and 50% a mixture of complex sodium compounds—quite different from the black ash of the soda process. Losses are made up by addition of commercial salt cake (sodium sulphate). This material, which is usually a by-product of hydrochloric acid manufacture, contains various impurities such as silica and compounds of iron and aluminum which contaminate the succeeding liquors. The mixed ash and salt cake are smelted to burn out the organic matter and the resulting smelt, mostly sodium carbonate and sodium sulphide, is run into water and dissolves forming the green liquor characteristic of the kraft process. It is important to distinguish this liquor from the corresponding liquor of the soda process. The soda process liquor is a practically pure solution of sodium carbonate, whereas the kraft process liquor is a solution of sodium carbonate, sodium sulphide, caustic soda and impurities both soluble and insoluble, the latter amounting to approximately ½% of the weight of the liquor. The liquor is boiled with calcium quicklime to convert the sodium carbonate to caustic soda, the sodium sulphide remaining unchanged. In the reaction calcium carbonate forms as in the soda process and is settled out of the liquor, carrying with it the insoluble impurities previously referred to and which give a black colour to both the green liquor and the sludge. All the iron compounds coming from the salt cake, smelter lining, etc., are precipitated in the green liquor mostly in the form of ferrous sulphide, which is a black slimy impurity that coats the lime lumps, interfering with the causticizing and retards settling out of the sludge. Insoluble silica from the salt cake and finely divided carbon from incompletely burned black ash, also various insoluble compounds of aluminum, calcium, magnesium, etc., from the salt cake and smelter lining are present in the sludge and all these impurities together render its use impossible for making bisulphite liquor.

Various methods have been proposed for purifying the green liquor of the kraft process, such, for example, as passing the liquor through a filter press. This is a very difficult operation because of the large quantities of strong hot alkaline liquors that must be forced through the apparatus and because it is difficult to find a filtering medium which will withstand the corrosive action of the liquor and will not clog up, and further because of the slimy nature of the insoluble impurities.

According to this invention the kraft green liquor is produced in any usual way at causticizing strength or at greater concentration and is then subjected to a settling operation to separate the insoluble impurities from a large part of the alkali liquor (about 90%) which is then ready for causticizing. The dregs resulting from the settling operation contain all the insoluble impurities of the green liquor together with about 10% of the liquor and in consequence about 10% of the total alkali, which portion of the alkali must be recovered as completely and economically as possible to avoid loss. These dregs are treated for removal of the accompanying alkali in any one of three ways, namely:—

1—By a series of alternate washing and settling operations.

2—By filtering in a filter press or rotary filter with a suitable amount of lime sludge which may be discarded, followed, perhaps, by washing with water on the filter.

3—By filtering and washing on a bed of sand, pulp or pulp screenings or other porous material.

In any of these ways the amount of alkali which cannot be economically recovered is small and the liquor obtained may be returned to the system for further use. The lime sludge obtained carries practically no more impurities than the lime sludge of a soda process. By reason of the purifying, the causticizing may be effected more quickly and easily and at less expense than is possible in the kraft process as ordinarily conducted.

In greater detail the process is as follows, a batch system being described to facilitate comprehension, but it will be understood the invention is not limited to batch operation but applies equally to continuous operation: Green liquor is prepared in the usual way by dissolving the smelt in water or weak alkali liquor in dissolving tanks, conditions being controlled as far as possible so that a strong solution having a temperature fairly near its boiling point will result. Each batch of green liquor from the dissolving tanks is allowed to settle for a period of two to four hours, more or less, depending on the amount and nature of impurities and the temperature. It has been found that the insoluble impurities in the liquor being chiefly iron sulphide, carbon, silica and calcium carbonate constitute a slimy, black, finely divided mixture which settles much better out of hot liquid than out of cold. The liquor may therefore be heated if not already hot enough, as received from the dissolving tanks. Ordinarily the temperature is about 90° C. to 100° C. but settling may be effected at temperatures below 90° C., or if the temperature of the liquor is lower than desirable it may be increased to nearly the boiling point by blowing steam into the liquor. Preferably the green liquor is made stronger than usual in the dissolving tanks before settling to ensure a high temperature and to enable the use of smaller apparatus than if the liquor was first prepared at causticizing strength. In about four hours, on the average, the settling will be complete and clear green liquor absolutely free from insoluble impurities, and of a pale yellow colour, may be pumped or siphoned out of the settling tank to a storage tank or direct to the causticizing tank. In practice the amount of green liquor treated at each settling operation, and the alkali strength thereof, should be such that the amount of clear liquor obtainable is sufficient for making a batch of caustic liquor acording to the requirements of the system. The black slimy dregs remaining are about 10% of the original volume of the liquor. Further settling does not effect any great reduction in the volume of the dregs. Removal of the clear liquor need not await completion of the settling as withdrawal may commence as soon as settling is well started, the siphon pipe being lowered in the tank as settling proceeds, and care being necessarily taken to keep the end of the pipe sufficiently above the unsettled liquor to avoid drawing any of it into the pipe. After the green liquor has been settled in this manner the dregs are drawn off or pumped out of the tank to a dregs storage tank, removal being assisted if necessary by sluicing out the settling tank with water or by agitation. The settling tank may be emptied of dregs after each settling or the dregs of several settlings may be accumulated before the settling tank is cleared of dregs.

It is advantageous to employ as a settling tank one of the causticizing tanks or a tank of equal capacity so connected as to be interchangeable with the causticizing tanks. Settling time is lowered by using a shallow tank rather than a deep tank of equal capacity for the reason that the time of settling depends on the vertical distance through which the particles must travel, although a tall tank would tend to concentrate the dregs more effectively. Using a causticizing tank or tank of equal capacity for the settling it is possible to settle several batches of green liquor between each emptying of the tank, or conversely, if the tank is emptied after each settling, a somewhat smaller tank will serve. One settling tank is sufficient to serve several causticizing tanks if the interval between pumping batches of green liquor is about six hours, but if the interval is much shorter or if the maximum degree of settling is desired the number of tanks must be increased.

As an alternative to the foregoing method of purifying the green liquor, one batch may be settled in a caustic tank and the clear liquor pumped to another caustic tank. Then another batch of raw green liquor, along with the dregs in the first tank, may be causticized direct with lime. In this way alternate batchs of lime sludge are purer while the remaining batches are doubly impure. This method allows of simple operation and fairly easy filtering, but does not reclaim all the sludge in pure form.

The dregs contain all the insoluble matter of the liquor admixed with about 10% of the liquor from which the alkali must be recovered. When there is a sufficient accumulation of dregs for economical treatment they may be dealt with in any one of three ways, as found most expedient.

*First method.*—The accumulated dregs are allowed to settle and any supernatant clear liquid siphoned off. The dregs are then agitated with water and settled, the top liquid being drawn off. This operation is repeated with fresh wash water each time until the settled dregs contain such a small percentage of alkali that it is not economical to continue the treatment. It is not necessary that the liquid drawn off after each settling be absolutely clear since it is preferably discharged to the dissolving tanks for re-passage through the purifying system. This will shorten the settling periods and considerably reduce the time of treatment in the dregs tank, and also secure a stronger green liquor in the dissolving tanks, or expedite attainment of the desired strength, while maintaining the operating balance in the system as a whole. The cloudy liquid may be filtered and added to the clear green liquor or to the weak liquor.

*Second method.*—The dregs tank receives every few hours a fresh batch of dregs. Any clear liquor which shows above the dregs is siphoned or pumped off before each addition of dregs. At any convenient time and when lime sludge from the causticizing operation is not required for other use, the accumulated dregs and a sufficient amount of lime sludge (for example, about five or more times the amount of dregs based on dry weights) are passed through a rotary filter or filter press. The sludge may be mixed with and thereby dilute the dregs or the dregs may be fed to the filter on top of the sludge cake which then acts as a filtering medium and protects the filter cloth. In either case filtering proceeds fairly easily with almost complete recovery of the alkali. The mixed sludge and impurities may be discharged to waste or used for a low grade product such as agricultural lime. The amount of sludge thus used may be varied from the amount previously mentioned between fairly wide limits and is in any case only a moderate proportion of that produced so that as regards both value and the problem of waste disposal it is a comparatively negligible consideration. If desired, the dregs may be diluted with water and settled prior to the filtering operation. As the filtrate is usually clear, the recovered alkali liquor may be discharged to the weak liquor tank, to the dissolving tanks or to any convenient part of the caustic room system.

*Third method.*—The accumulated dregs, either with or without one or more preliminary water washing and settling operations, are filtered on a bed of sand or fibrous material, such as pulp or pulp screenings, or any other suitable filtering medium which is cheap and readily obtainable, and finally washed with water. Preferably the filtering is effected in a closed vessel wherein the filtering medium is supported on a false perforated bottom, passage of the liquid being hastened by application of either suction or pressure or both. The filtrate obtained need not be clear as it may be delivered to the dissolving tanks for re-passage through the purifying system.

If desired, the dregs may, after a preliminary treatment according to the first method, be filtered according to either of the second or third methods, but usually such double treatment is not essential, although it may prove convenient and more efficient. The dregs before filtering are preferably as much concentrated as convenient and if it is considered expedient the dregs on the filter after filtering may be washed with water to remove an additional amount of alkali.

The clear liquid from the initial settling is absolutely, or for all practical purposes, free from insoluble impurities, and is diluted if necessary to proper strength for causticizing, which operation is performed in the usual manner. In the causticizing operation the lime is largely changed to calcium carbonate in the form of finely divided, chalk-like particles and the sodium carbonate is changed to sodium hydroxide, forming with the sodium sulphide the so-called white liquor for the digesters. The mixture is settled for several hours and the clear liquor drawn off. The lime sludge remaining includes about 25% of the total caustic liquid which is recovered as far as economically possible by repeated washing and settling operations or by filtration or both. This lime sludge is fairly white, substantially pure calcium carbonate much like that recovered from a soda process. Any grayish colour is due to a small amount of iron compounds (black ferrous sulphide), the iron coming from the quicklime used in causticizing. There is usually mixed with the sludge (as in a soda process) a certain amount of unconverted calcium hydroxide. The sludge is, practically speaking, as pure as the quicklime used or the high grade limestone from which it is made.

The washed sludge is thinned with water and discharged to a storage tank fitted with an agitator to maintain the calcium carbonate in suspension while permitting the settling out of any sand, etc., which may have come from the quicklime used for causticizing. This thin sludge is next flowed slowly over a riffler, of any convenient design, fitted with baffles for separation of any remaining sand or coarse particles and is finally diluted to proper consistency with cold water and fed through an absorption apparatus to which sulphur dioxide gas is supplied, thus producing the well known acid or bisulphite liquor used in making sulphite pulp. In this way kraft and sulphite processes may be carried out in one plant with great economy of material.

Alternatively, the sludge may be dried either before or after purification and shipped to a distant sulphite plant for use after dilution and, if necessary, purification.

The invention presents important advantages from these aspects, namely, advantages pertaining to a kraft process, advantages pertaining to a sulphite process, and advantages arising from the possibility of ecomically operating both processes side by side, the one supplying raw material for the other, which result is not known to have been hitherto obtained.

From the aspect of the kraft process the advantages are considerable due to purification of the green liquor by removal of the insolubles. The slimy ferrous sulphide present in ordinary kraft green liquor coats the lumps of lime during causticizing and prevents or retards its reaction with the sodium carbonate. As a result of operating according to this invention considerably less time is required for causticizing and the operation is materially expedited. Removal of the insoluble impurities before causticizing allows the lime sludge to settle more rapidly and more completely and enables a more complete recovery of caustic liquor from the sludge. The capacity of the caustic tanks and washing equipment is, as a result, increased, or, conversely, a smaller equipment will serve. The purified lime sludge is also more easily washed and filtered. Finally, the sludge itself is changed from more or less of a liability to a very considerable asset.

From the aspect of the sulphite process, the sludge is in some respects superior to limestone or magnesia lime. It is finely divided and more easily handled and controlled than limestone in a tower system. The small amounts of caustic soda and sodium carbonate usually present are superior to ordinary lime in the sulphite process, and the traces of other soda and sulphide compounds have no noticeable disadvantage. In the milk of lime system considerable heat is liberated in slacking the lime which increases the temperature of the liquor and reduces its absorption capacity. Using lime sludge the temperature rise during absorption of sulphur dioxide is only about half that occurring with the hydroxide milk of lime. This difference, which amounts to about 8° C., is very important, especially in summer when the water supply is initially warm. Furthermore, the sludge being calcium carbonate when in contact with sulphur dioxide, changes readily from the insoluble to the soluble form without trouble in the calcium monosulphite stage, whereas the calcium hydroxide in magnesia lime milk tends to form a precipitate of insoluble monosulphite which plugs the holes in the tower plates and otherwise chokes the apparatus with scale that must be removed periodically. Kraft lime sludge prepared according to this invention can be used in any of the ordinary types of milk of lime apparatus with substantially no change and the capacity of the apparatus is apparently greater than when using magnesia lime. Finally the sludge is a waste product available at little or no cost and is therefore more economical than magnesia lime which costs about $2.00 per ton of pulp. The small amount of ferrous sulphide coming from the causticizing operation is not detrimental since it reacts with the sulphur dioxide forming a colourless soluble compound in the same way as the iron present in the limestone or magnesia lime.

From the aspect of simultaneous operation of kraft and sulphite processes side by side, the invention presents the unique advantage that by it kraft sludge is for the first time rendered available as a completely suitable raw material in the sulphite process thus enabling the cost of the lime used in the kraft process to be distributed between the two processes. In other words, the invention enables a new and economical combination of processes to be obtained. The lime sludge produced per ton of kraft pulp is sufficient for making acid to digest nearly two tons of sulphite pulp.

The accompanying diagrammatic drawing illustrates an apparatus suitable for putting the invention into practice in any of the three ways described.

Referring to the drawings, 11 designates dissolving tanks arranged to discharge into a settling tank 12 which may be one of a series of causticizing tanks of which others are designated 13 and 14, or may be independent of the series. Clear green liquor may be siphoned or drawn from the settling tank through a swinging siphon or suction pipe 15 and the liquor conveyed through the line 16 to either of the tanks 13 or 14.

After causticizing the strong white liquor is transferred to the storage tank 17 from which it is drawn as required to charge the digesters. Weak liquor from tank 18 is first used to wash the lime sludge in the tanks 13 and 14 and this wash liquor usually goes to the dissolving tanks 11. The washed sludge from the tanks 13 and 14 goes through the line 19 to the storage tank 20 and from thence as convenient to the rotary or press filter 21 where it is washed with hot water from tank 24. The extracted weak liquor goes through the line 22 back to the tank 18. The cake from the filter 21 is discharged with cold water to the settling tank 23 where, by gentle agitation, the heavy grit is settled out. The sludge then passes through the riffler 25 to the tank 26 where it is thinned to proper consistency for passage through the absorption tower 27.

Weak liquor from the tank 18 may go through the line 28 back to the causticizing tanks or on through the branch 29 to the dissolving tanks. The draw-off line 30 of the causticizing tanks is tapped at 31 into the line 28 so that wash water may be passed directly from tank to tank or to the dissolving tanks. The hot water tank 24 is also connected at 32 into the weak liquor line 28 to provide clear wash water when desired. The dregs from the settling tank 12 go to the dregs storage tank 33 where they are settled from water as often as desired, the water coming from the tank 24 or from a cold water supply. The wash water of the dregs goes through the line 34 to the dissolving tanks 11. The washed dregs may be discharged to waste or passed to the filter 21 or to a special sand or pulp filter 35. The weak green liquor from the filter 35 normally goes through the lines 36 and 34 to the dissolving tanks but may if clear go through the by-pass 37 into the weak liquor line 22 and to the tank 18. The weak green liquor extracted in the filter 21 may, if clear, go through the line 22 to the weak liquor tank, but may go through the by-pass 37 and lines 36 and 34 to the dissolving tanks.

It will be understood that many modifications of detail are possible and that as a result all such modifications as fall within the scope of the appended claims are included in the invention, which is not limited to the precise steps or combinations of steps herein disclosed for purposes of explanation.

In the appended claims the term "washing" is to be understood, unless the context otherwise requires, in a broad sense and as including filtering which is merely a special method of washing.

For the purposes of this invention the term "kraft" is to be regarded as synonymous with "sulphate."

Having thus described my invention, what I claim is:—

1. In the manufacture of chemical pulp, the steps of settling kraft green liquor; separating the supernatant clear liquor from the underlying dregs; and causticizing the clear liquor.

2. In the manufacture of chemical pulp, the steps of settling kraft green liquor; separating the supernatant clear liquor from the underlying dregs; and causticizing the clear liquor; and treating the dregs for recovery of alkali therefrom and returning the recovered alkali into the system for causticizing.

3. In the manufacture of chemical pulp, the steps of settling kraft green liquor; separating the supernatant clear liquor from the underlying dregs; and causticizing the clear liquor; and separating the resulting clear white liquor and nearly white, nearly pure lime precipitate.

4. In the manufacture of chemical pulp, the steps of settling kraft green liquor; separating the supernatant clear liquor from the underlying dregs; and causticizing the clear liquor; and separating the resulting clear white liquor and nearly white, nearly pure lime precipitate; and treating the dregs for recovery of alkali therefrom and returning the recovered alkali into the system for causticizing.

5. In the manufacture of chemical pulp, the steps of settling kraft green liquor, drawing off the resulting clear liquid, causticizing the clear liquid, settling the causticized liquid, drawing off the resulting clear caustic liquid and washing the nearly white, nearly pure lime sludge for recovery of caustic alkali therefrom.

6. In the manufacture of chemical pulp, the steps of settling kraft green liquor, drawing off the resulting clear liquid, causticizing the clear liquid, settling the causticized liquid, drawing off the resulting clear caustic liquid and washing the nearly white, nearly pure lime sludge for recovery of caustic alkali therefrom; washing and settling the dregs of the green liquor settling for recovery of alkali therefrom and returning the recovered alkali into the system for causticizing.

7. In the manufacture of chemical pulp, the steps of settling kraft green liquor; separating the supernatant clear liquor from the underlying dregs; causticizing the clear liquor and settling the resulting suspension; removing the supernatant clear caustic liquor for use in kraft digesters; recovering caustic alkali from the sludge by washing and settling and finally filtering.

8. In the manufacture of chemical pulp, the steps of settling kraft green liquor; drawing off and causticizing the resulting clear liquor and subjecting the dregs of the first settling to a series of alternate washing and settling operations, the supernatant clear liquor of each settling being removed and returned to the system for causticizing.

9. In the manufacture of chemical pulp, the steps of dissolving the molten smelt of a kraft process in weak alkali liquor from a previous cycle of operation, settling the resulting hot green liquor, drawing off and causticizing the supernatant clear liquor of the settling operation; separating alkali in a weak solution from the dregs of the first settling operation and returning such weak alkali liquor to the smelt dissolving, whereby the alkali recovered from the dregs is largely obtained in the first settling of the next green liquor cycle.

10. In the manufacture of chemical pulp, the steps of dissolving the molten smelt of a kraft process in the weak alkali liquor from a previous cycle of operation, settling the resulting green liquor; drawing off and causticizing the supernatant clear liquor of the settling operation, filtering the dregs of the settling operation with part of the lime sludge of the causticizing operation, and returning the filtrate into the system.

11. In the manufacture of chemical pulp, the steps of dissolving the molten smelt of a kraft pulp process in an aqueous solvent under conditions such that the resulting solution will have a temperature only a little below its boiling point, settling the solution while hot and removing the supernatant clear liquid, causticizing the clear liquid and separating alkali from the dregs of the settling operation.

12. In the manufacture of chemical pulp, the steps of heating kraft green liquor to a temperature only a little below its boiling point and settling the hot green liquor; removing the clear liquor of the settling operation and causticizing the same and separating alkali from the dregs of the settling operation and returning the recovered alkali into the system for causticizing.

13. In the manufacture of chemical pulp, the steps of dissolving the molten smelt of a kraft pulp process in water, settling the solution and drawing off the clear liquid, washing the dregs of the settling operation and returning the wash water to the smelt dissolving operation for use as smelt solvent, causticizing the clear liquid and separating the caustic liquid and precipitated lime therein.

14. In the manufacture of chemical pulp, the steps of preparing strong kraft green liquor, settling insoluble impurities out of the strong liquor and separating the pure liquor from the sediment, causticizing the pure liquor, and separating the resulting caustic liquid and precipitated lime containing as insoluble impurities substantially only those imported during the causticizing operation.

15. In the manufacture of chemical pulp, the steps of dissolving the smelt of a kraft pulp process in weak alkali liquor from a previous cycle of operation, settling the solution and drawing off the clear liquor, filtering the dregs of the settling operation through a sand or fibre bed, and returning the filtrate into the system; causticizing the clear liquid of the settling operation and separating the resulting caustic liquor and nearly white, nearly pure lime precipitate.

16. A process for reduction of the amount of lime required in the manufacture of chemical pulp, which comprises causticizing kraft green liquor after separation therefrom by sedimentation of impurities which coat lime particles during the causticizing operation and prevent causticizing action of the particles so coated.

17. The improvement in the art of causticizing kraft green liquor, which comprises settling the liquor while at a concentration above causticizing strength and drawing off the supernatant clear liquor, washing the alkali out of the settlings and returning the wash water with recovered alkali therein into the system reducing the concentration of the clear liquor and causticizing the liquor by boiling with quicklime.

18. A process according to claim 17, in which the settling operation is conducted at a temperature of about 90° to 100° C.

19. The improvement in the art of preparing kraft cooking liquor which comprises, settling a solution of the smelt of kraft black ash and make-up salt cake, at concentration above that advantageous for causticizing, separating the supernatant clear liquor from the settlings, washing the settlings for recovery of alkali therefrom and adding the wash water with recovered alkali therein to the clear liquor previously separated, thereby to reduce the concentration thereof, causticizing the liquor by boiling with quicklime, and separating clear caustic liquor from precipitated lime.

20. A process according to claim 19, in which the smelt solvent is in part at least washings of the settlings of the settling operation.

21. The improvement in the art of preparing kraft cooking liquor, which comprises dissolving the smelt of kraft black ash and make-up salt cake in a weak solution of similar smelt, settling the resulting liquor and drawing off the supernatant clear portion thereof, washing the settlings for recovery of alkali therefrom and returning the washings into the system, causticizing the clear alkali solution and separating clear caustic liquor and precipitated lime.

In witness whereof, I have hereunto set my hand.

JOHN S. BATES.